United States Patent
Loven (10) Patent No.: US 10,917,042 B2
(45) Date of Patent: Feb. 9, 2021

(54) SOLAR ENERGY COLLECTION SYSTEM EMPLOYING A HORIZONTAL REFLECTOR AND A METHOD OF MAKING AND USING SAME

(71) Applicant: James Loven, Scranton, PA (US)

(72) Inventor: James Loven, Scranton, PA (US)

( * ) Notice: Subject to any disclaimer, the term of this patent is extended or adjusted under 35 U.S.C. 154(b) by 0 days.

(21) Appl. No.: 16/179,918

(22) Filed: Nov. 3, 2018

(65) Prior Publication Data
US 2020/0144962 A1     May 7, 2020

(51) Int. Cl.
*H02S 40/22*     (2014.01)
*H02S 20/32*     (2014.01)

(52) U.S. Cl.
CPC .............. *H02S 40/22* (2014.12); *H02S 20/32* (2014.12)

(58) Field of Classification Search
CPC ................................ H02S 40/22; H02S 20/32
See application file for complete search history.

(56) References Cited

U.S. PATENT DOCUMENTS

| | | | | |
|---|---|---|---|---|
| 5,994,641 A * | 11/1999 | Kardauskas | .......... | H01L 31/048 136/246 |
| 9,548,698 B2 | 1/2017 | Loven | | |
| 2011/0140106 A1 * | 6/2011 | Forbes | .............. | H01L 31/03762 257/53 |
| 2014/0261629 A1 * | 9/2014 | Loven | ..................... | H02S 20/32 136/246 |
| 2015/0243804 A1 * | 8/2015 | Thaidigsmann | .. | H01L 31/02167 136/256 |
| 2015/0249166 A1 * | 9/2015 | Iitsuka | ................. | G02B 5/0215 136/256 |
| 2020/0007076 A1 * | 1/2020 | King | ..................... | H02S 40/22 |

OTHER PUBLICATIONS

King et al., U.S. Appl. No. 62/660,188, filed Apr. 2018.*
King et al. U.S. Appl. No. 62/660,191, filed Apr. 2018.*

* cited by examiner

*Primary Examiner* — Jayne L Mershon
(74) *Attorney, Agent, or Firm* — James McDaniel; Lawrence P. Zale; Zale Patent Law, Inc.

(57) ABSTRACT

A reflective solar tracker system for collecting solar energy from the sun and converting the solar energy to electricity, using one or more photovoltaic devices, each of which has a sunlight-collecting surface, including a horizontal reflector panel retaining assembly, wherein the horizontal reflector panel retaining assembly further comprises a horizontal reflector panel such that the horizontal reflector panel includes a non-uniform, textured finish located on a sun-facing surface area of the horizontal reflector panel, a reflective solar tracker retaining/rotating assembly operatively connected to the horizontal reflector panel retaining assembly, and a reflective solar tracker array retaining assembly operatively connected to the horizontal reflector panel retaining assembly and the reflective solar tracker retaining/rotating assembly.

9 Claims, 9 Drawing Sheets

SOLAR ENERGY COLLECTION SYSTEM EMPLOYING A HORIZONTAL REFLECTOR AND A METHOD OF MAKING AND USING SAME

FIELD OF THE INVENTION

The present invention is generally related to a solar energy collection system for collecting and converting solar energy to electricity. More particularly, the present invention relates to a solar energy collection system having photovoltaic devices formed into an array of solar panels, and which further includes a horizontal reflective panel having a non-uniform textured finish to concentrate incident solar energy onto the array of solar panels.

BACKGROUND OF THE INVENTION

It is known that photovoltaic (PV) devices, such as solar panels, are used to collect and convert incident radiation from the sun (sunlight) into electricity. Such solar panels generate electricity directly from sunlit semiconductor materials in which electrons are freed by solar energy and can be induced to travel through an electrical circuit. In use, an array of one or more solar panels is typically installed on a roof, or on one or more carriers affixed to the ground or another substrate, to catch as much sunlight as possible.

Maximizing the amount of sunlight impinging on the solar panels maximizes the amount of energy collected and converted to electricity by solar panels. The amount of sunlight that can be collected by solar panels is limited by a number of factors. Generally, each solar panel has a planar sunlight-collecting surface. The total area of the sunlight-collecting surface of a single solar panel, or of the collective sunlight-collecting surfaces of two or more solar panels in an array, is one factor affecting the amount of sunlight which can be collected. Thus, multiple solar panels are often used together to enlarge the total sunlight-collecting surface area, because there are practical limits to how large each panel can be manufactured. When multiple solar panels are used, the solar panels may be positioned with their sunlight-collecting surfaces lying generally in the same plane, facing the same direction.

Another way to increase the amount of sunlight collected by the solar panels is to attach one or more reflector panels at the outer periphery of the sunlight-collecting surfaces of the solar panels to reflect and concentrate incident sunlight onto the sunlight-collecting surfaces. The sunlight thus reflected would otherwise fall outside of the periphery of the sunlight-collecting surface area and be lost. Thus, the use of one or more reflective panels, including horizontal reflective panels, in addition to the solar panels increases the efficiency of solar energy collection systems.

While it is desired to utilize as many sun-collecting surfaces as possible, due to the size of a typical solar panel (a typical residential solar panel measures 65 inches high×39 inches wide and a commercial solar panel measures 77 inches high×39 inches wide), wind load on an array of solar panels can become very significant. In fact, a significant amount of wind may cause the solar panel array to tip over which is highly undesirable.

Due to the possibility of wind significantly damaging an array of solar panels, wind loads must be considered when designing a sunlight collecting device such as a reflective solar tracker. In particular, the wind profile of a reflective solar tracker should be as small as possible. It is clear from the above discussion that prior embodiments of sunlight collecting devices such as the reflective solartracker present a large profile to the wind.

It is further known that wind load on a reflective solar tracker is defined by the working formula:

$$Fw = A*P*Cd \qquad \text{(Equation 1)}$$

where Fw is the force exerted by the wind on a surface,
A is the cross-sectional area of the surface to the wind, (L*W),
P is the pressure placed on the area by the wind, ($P=0.00256*V^2$),
V is the velocity of the wind in miles per hour, and
Cd is the drag coefficient associated with the surface.
So, Fw can be rewritten as:

$$Fw = A*(0.00256*V*V)*Cd \qquad \text{(Equation 2)}$$

Given the factor 0.00256 and the drag coefficient are the same for the following illustrations, the previous expression may be simplified to:

$$Fw : AV^2 \qquad \text{(Equation 3)}$$

In short, as shown in Equation 3, force (Fw) due to the wind is proportional to the surface area (A) times the wind velocity squared ($V^2$). Therefore, it is important that a reflective solar tracker should be constructed such that the reflective solar tracker minimizes the wind profile acting upon the reflective solar tracker while maintaining increased energy production through the use of a horizontal reflector.

Finally, prior to the present invention, as set forth in general terms above and more specifically below, it is known, to employ a solar energy collection system employing reflectors and sun tracking. See for example, U.S. Pat. No. 9,548,698 by Loven. While this solar energy collection system employing reflectors and sun tracking has proven to be generally satisfactory, there is nevertheless a need for a new and improved reflective solar tracker that minimizes the wind profile while maintaining increased energy production through the use of a horizontal reflector having a non-uniform textured finish.

It is a purpose of this invention to fulfill these and other needs in the art of reflective solar trackers in a manner more apparent to the skilled artisan once given the following disclosure.

BRIEF SUMMARY OF THE INVENTION

A first aspect of the present invention is a reflective solar tracker system for collecting solar energy from the sun and converting the solar energy to electricity, using one or more photovoltaic devices, each of which has a sunlight-collecting surface, including a horizontal reflector panel retaining assembly, wherein the horizontal reflector panel retaining assembly further comprises a horizontal reflector panel such that the horizontal reflector panel includes a non-uniform, textured finish located on a sun-facing surface area of the horizontal reflector panel, a reflective solar tracker retaining/rotating assembly operatively connected to the horizontal reflector panel retaining assembly, and a reflective solar tracker array retaining assembly operatively connected to the horizontal reflector panel retaining assembly and the reflective solar tracker retaining/rotating assembly.

In one embodiment of the first aspect of the present invention, the horizontal reflector panel retaining assembly further includes a reflector strut operatively connected on one end to the horizontal reflector panel, a cantilever arm operatively connected to the reflector strut, a carriage strut operatively connected on one end to the cantilever arm and operatively connected on the other end to the reflective solar tracker retaining/rotating assembly, and a toe operatively connected to the cantilever arm and one end of the horizontal reflector panel such that the horizontal reflector panel can rotate on the toe.

In another embodiment of the first aspect of the present invention, the reflective solar tracker retaining/rotating assembly further includes a stationary base, a plurality of rollers located adjacent to the stationary base, a rotating carriage located adjacent to the plurality of rollers, a rotating shaft operatively connected to the rotating carriage, a carriage strut operatively connected to the rotating carriage and the rotating shaft, a rack strut operatively connected to the rotating shaft and the reflective solar tracker array retaining assembly, and a sun tracking device operatively connected to the rotating shaft.

In a further embodiment of the first aspect of the present invention, the reflective solar tracker array retaining assembly further includes an array of photovoltaic panels, a plurality of spacers located on a back side of the array of photovoltaic panels, and an array rack operatively connected to the plurality of spacers and operatively connected to the horizontal reflector panel retaining assembly and the reflective solar tracker retaining/rotating assembly.

In still another embodiment of the first aspect of the present invention, the non-uniform, textured finish located on a sun-facing surface area of the horizontal reflector panel further includes a plurality of non-uniform lines, wherein the non-uniform lines have a random spacing between each of the lines and perpendicular to the incident sun rays.

In yet another embodiment of the first aspect of the present invention, the plurality of non-uniform lines further includes a plurality of non-uniform scratches.

In still another embodiment of the first aspect of the present invention, the non-uniform, textured finish located on a sun-facing surface area of the horizontal reflector panel further includes that the plurality of non-uniform lines is located in one direction along the sun-facing surface area of the horizontal reflector panel.

A second aspect of the present invention is a solar energy system for collecting solar energy from the sun and converting the solar energy to electricity, using one or more photovoltaic devices, each of which has a sunlight-collecting surface, including a horizontal reflector panel retaining assembly, wherein the horizontal reflector panel retaining assembly further comprises a horizontal reflector panel such that the horizontal reflector panel includes a non-uniform, textured finish in one direction along a sun-facing surface area of the horizontal reflector panel, a reflective solar tracker retaining/rotating assembly operatively connected to the horizontal reflector panel retaining assembly, and a reflective solar tracker array retaining assembly operatively connected to the horizontal reflector panel retaining assembly and the reflective solar tracker retaining/rotating assembly.

In an embodiment of the second aspect of the present invention, the horizontal reflector panel retaining assembly further includes a reflector strut operatively connected on one end to the horizontal reflector panel, a cantilever arm operatively connected to the reflector strut, a carriage strut operatively connected on one end to the cantilever arm and operatively connected on the other end to the reflective solar tracker retaining/rotating assembly, and a toe operatively connected to the cantilever arm and one end of the horizontal reflector panel such that the horizontal reflector panel can rotate on the toe.

In another embodiment of the second aspect of the present invention, the reflective solar tracker retaining/rotating assembly further includes a stationary base, a plurality of rollers located adjacent to the stationary base, a rotating carriage located adjacent to the plurality of rollers, a rotating shaft operatively connected to the rotating carriage, a carriage strut operatively connected to the rotating carriage and the rotating shaft, a rack strut operatively connected to the rotating shaft and the reflective solar tracker array retaining assembly, and a sun tracking device operatively connected to the rotating shaft.

In a further embodiment of the second aspect of the present invention, the reflective solar tracker array retaining assembly further includes an array of photovoltaic panels, a plurality of spacers located on a back side of the array of photovoltaic panels, and an array rack operatively connected to the plurality of spacers and operatively connected to the horizontal reflector panel retaining assembly and the reflective solar tracker retaining/rotating assembly.

In yet another embodiment of the second aspect of the present invention, the non-uniform, textured finish in one direction along a sun-facing surface area of the horizontal reflector panel further includes a plurality of non-uniform lines, wherein the non-uniform lines have a random spacing between each of the lines and are perpendicular to incident sun rays.

In still another embodiment of the second aspect of the present invention, the plurality of non-uniform lines further includes a plurality of non-uniform scratches.

A third aspect of the present invention is a method of constructing a reflective solar tracker system for collecting solar energy from the sun and converting the solar energy to electricity, using one or more photovoltaic devices, each of which has a sunlight-collecting surface, including the steps of: providing a horizontal reflector panel retaining assembly, wherein the horizontal reflector panel retaining assembly further comprises a horizontal reflector panel such that the horizontal reflector panel includes a non-uniform, textured finish located on a sun-facing surface area of the horizontal reflector panel; providing a reflective solar tracker retaining/rotating assembly operatively connected to the horizontal reflector panel retaining assembly; and providing a reflective solar tracker array retaining assembly operatively connected to the horizontal reflector panel retaining assembly and the reflective solar tracker retaining/rotating assembly.

In an embodiment of the third aspect of the present invention, the step of providing a horizontal reflector panel retaining assembly further includes the steps of: providing a reflector strut operatively connected on one end to the horizontal reflector panel; providing a cantilever arm operatively connected to the reflector strut; providing a carriage strut operatively connected on one end to the cantilever arm and operatively connected on the other end to the reflective solar tracker retaining/rotating assembly; and providing a toe operatively connected to the cantilever arm and one end of the horizontal reflector panel such that the horizontal reflector panel can rotate on the toe.

In another embodiment of the third aspect of the present invention, the step of providing a reflective solar tracker retaining/rotating assembly further includes the steps of: providing a stationary base; providing a plurality of rollers located adjacent to the stationary base; providing a rotating carriage located adjacent to the plurality of rollers; providing a rotating shaft operatively connected to the rotating carriage; providing a carriage strut operatively connected to the rotating carriage and the rotating shaft; providing a rack strut operatively connected to the rotating shaft and the reflective solar tracker array retaining assembly; and providing a sun tracking device operatively connected to the rotating shaft.

In a further embodiment of the third aspect of the present invention, the step of providing a reflective solar tracker array retaining assembly further includes the steps of: providing an array of photovoltaic panels; providing a plurality of spacers located on a back side of the array of photovoltaic panels; and providing an array rack operatively connected to the plurality of spacers and operatively connected to the horizontal reflector panel retaining assembly and the reflective solar tracker retaining/rotating assembly.

In yet another embodiment of the third aspect of the present invention, the step of providing a non-uniform, textured finish located on a sun-facing surface area of the horizontal reflector panel further includes the step of providing a plurality of non-uniform lines, wherein the non-uniform lines have a random spacing between each of the lines and the lines are substantially parallel to the array of photovoltaic panels and perpendicular to incident sun rays.

In still another embodiment of the third aspect of the present invention, the step of providing a plurality of non-uniform lines further includes the step of providing a plurality of non-uniform scratches.

In a still further embodiment of the third aspect of the present invention, the step of providing a non-uniform, textured finish located on a sun-facing surface area of the horizontal reflector panel further includes the step of locating the plurality of non-uniform lines in one direction along the sun-facing surface area of the horizontal reflector panel, that is perpendicular to incident sun rays and the PV array.

The preferred solar energy collection system and method that employs a horizontal reflector having a non-uniform textured surface, according to various embodiments of the present invention, offers the following advantages: ease of use; increased solar energy collection capabilities; reduction in overall size; decreased likelihood of wind damage; reduced amount of wind force acting upon the solar panel array structure; the ability to track the movement of the sun; increased cost effectiveness; and the ability to efficiently collect sunlight at early and late hours of the day. In fact, in many of the preferred embodiments, these advantages are optimized to an extent that is considerably higher than heretofore achieved in prior, known reflective solar trackers.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

Figure 1A:
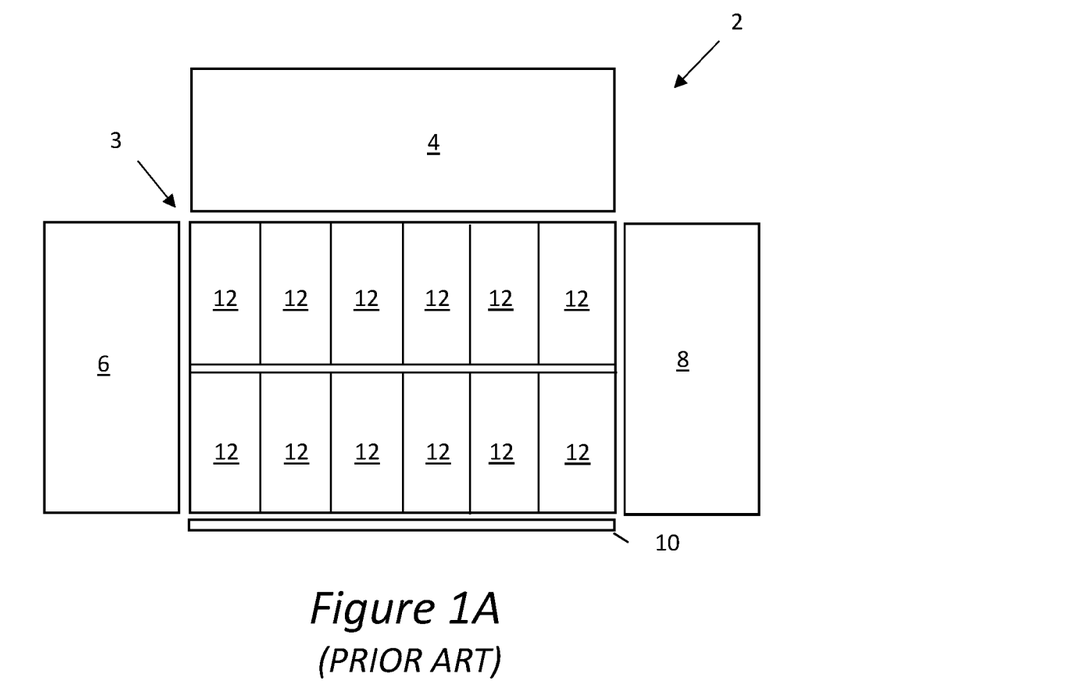
FIG. 1A is a schematic illustration of a reflective solar tracker, constructed according to the prior art.

As discussed above, one of the major shortcomings of the prior, known reflective solar trackers is that the size of the prior, known reflective solar trackers creates an issue with respect to the wind load on a reflective solar tracker. As shown in FIG. 1A, a prior, known reflective solar tracker 2 includes reflector panels 4, 6, 8 and 10 placed on all four sides of the photovoltaic (PV) array 3 of twelve (12) panels which is conventionally tilted down from the zenith at 45°. The total area of this prior, known reflective solar tracker 2 is approximately 48 units squared. It is to be understood that reflective solar trackers are a type of solar energy system for collecting solar energy from the sun and converting the solar energy to electricity, using one or more photovoltaic devices, each of which has a sunlight-collecting surface. In particular, reflective solar trackers use a conventional sun tracking device 218 to track the location of and move with the location of the sun to allow the solar panels to face the sun as the sun changes its position in the sky.

In order to address the shortcomings of the prior, known reflective solar trackers, reference is made now to FIGS.

1B-8B, where there is illustrated a reflective solar tracker 100 that minimizes the wind profile while maintaining increased energy production through the use of a horizontal reflector 110 having a non-uniform, textured finish in one direction along the sun-facing surface area of the horizontal reflector 110. It is to be understood that the reflective solar tracker 100 can be used with stationary or non-stationary arrays.

As shown in FIGS. 1B-2B, there is illustrated reflective solar tracker 100 that minimizes the wind profile while maintaining increased energy production through the use of a horizontal reflector having a non-uniform, textured finish in one direction along the sun-facing surface area of the horizontal reflector 110. Reflective solar tracker 100 includes, in part, horizontal reflector panel retaining assembly 150, reflective solar tracker retaining/rotating assembly 200, and reflective solar tracker array retaining assembly 250 for retaining photovoltaic (PV) array 103 of ten (10) panels 112.

Figure 1B:
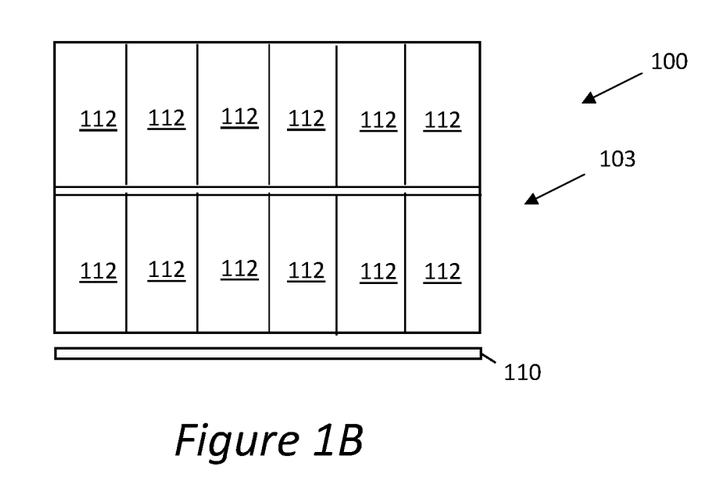
FIG. 1B is a schematic illustration of a reflective solar tracker with a horizontal reflector having a non-uniform textured surface, constructed according to the present invention.

A unique aspect of the present invention is shown in FIG. 1B. FIG. 1B shows a similar 12 panel PV array 103 without side reflectors and without a top reflector, as previously used in the prior, known reflective solar tracker 2 of FIG. 1A. However, in the reflective solar tracker 100 of FIG. 1B, only the bottom reflector 110 remains. Due to the elimination of the side reflectors and the top reflector, the total area of reflective solar tracker 100 is approximately 24 units squared. This elimination of the side and top reflectors reduces the force of the wind acting on the reflective solar tracker 100 to approximately one half compared to the prior, known reflective solar tracker 2 which substantially reduces the likelihood of the reflective solar tracker 100 experiencing significant damage due to a high wind force.

Horizontal Reflector Panel Retaining Assembly

Figure 2A:
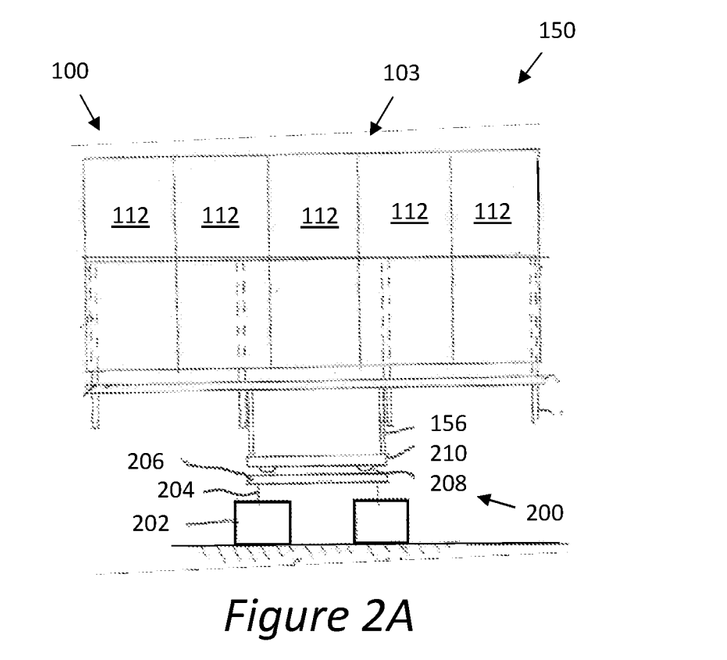
FIG. 2A is a front schematic illustration of the reflective solar tracker having a horizontal reflector of FIG. 1B, wherein the reflective solar tracker is connected to a solar tracking device, constructed according to the present invention.
Figure 2B:
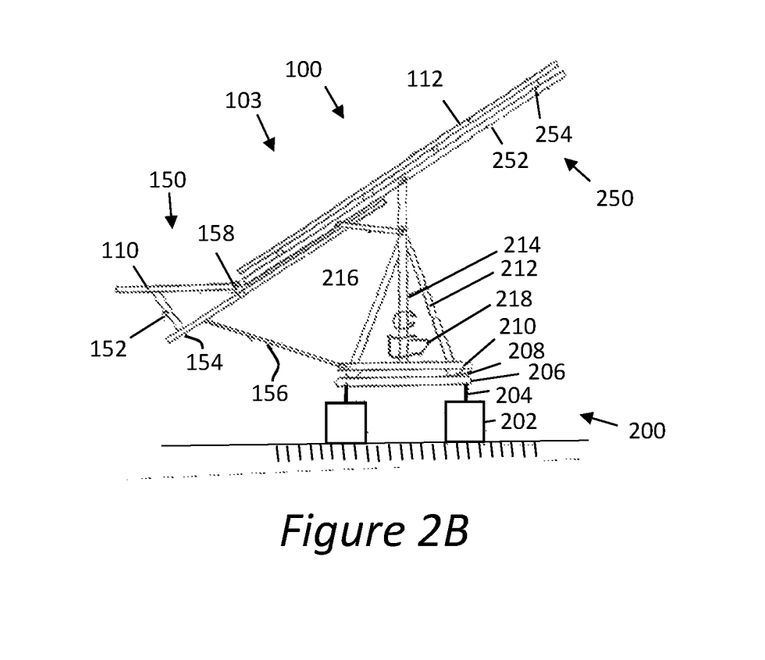
FIG. 2B is a side schematic illustration of the reflective solar tracker having a horizontal reflector of FIG. 2A, wherein the reflective solar tracker is connected to a solar tracking device, constructed according to the present invention.

With respect to the horizontal reflector panel retaining assembly 150, as shown in FIGS. 1B, 2A and 2B, reflective solar tracker 100 includes, in part, photovoltaic (PV) array 103 of ten (10) photovoltaic panels 112. It is to be understood that photovoltaic panels 112 are conventional photovoltaic panels that are conventionally connected together and held in place by retaining assembly 250. Also, located below photovoltaic panels 112 is horizontal reflector 110 having a non-uniform, textured surface, as will be described in greater detail later.

As shown more clearly in FIGS. 2A and 2B, horizontal reflector panel retaining assembly 150 also includes, in part, horizontal reflector 110, reflector struts 152, cantilever arms 154, carriage struts 156, and toes 158. Preferably, reflector struts 152, cantilever arms 154, carriage struts 156, and toes 158 are constructed of any suitable, durable, UV resistant, high strength material. It is to be understood that horizontal reflector 110 is conventionally attached to toe 158 so that an angle of horizontal reflector 110 with respect to photovoltaic panels 112 can adjusted. It is to be further understood that reflector struts 152 are conventionally attached to the back of horizontal reflector 110 and the fronts of cantilever arms 154 by conventional material fastening techniques such as welding, soldering, fasteners or the like. It is to be even further understood that cantilever arms 154 are conventionally attached to rack 252 by conventional material fastening techniques such as welding, soldering, fasteners or the like. Finally, it is to be understood that carriage struts 156 are conventionally attached to the backs of cantilever arms 154 and carriage 210 by conventional material fastening techniques such as welding, soldering, fasteners or the like.

Reflective Solar Tracker Retaining/Rotating Assembly

With respect to the reflective solar tracker retaining/rotating assembly 200, as shown in FIGS. 2A and 2B, reflective solar tracker retaining/rotating assembly 200 includes, in part, footings 202, footing extensions 204, stationary base 206, rollers 208, rotating carriage 210, carriage struts 212, rotating shaft 214, rack struts 216 and conventional sun tracking device 218. Preferably, footings 202, footing extensions 204, stationary base 206, rollers 208, rotating carriage 210, carriage struts 212, rotating shaft 214, and rack struts 216 are constructed of any suitable, durable, UV resistant, high strength material. It is to be understood that rotating shaft 214 is conventionally attached to rack 252 by conventional material fastening techniques such as welding, soldering, fasteners or the like. It is to be further understood that rack struts 216 are conventionally attached to rotating shaft 214 and cantilever arms 154 by conventional material fastening techniques such as welding, soldering, fasteners or the like.

Regarding the operation of reflective solar tracker retaining/rotating assembly 200, it is to be understood that reflective solar tracker retaining/rotating assembly 200 is used to rotate reflective solar tracker 100 in a manner similar to the rotation of the solar energy collection system as set forth in the previously discussed U.S. Pat. No. 9,548,698 by Loven, hereinafter referred to as the '698 Loven patent. In particular, as discussed in the '698 Loven patent, the solar energy collection system is adapted to track the location of and move with the location of the sun to allow the solar panels 112 to face the sun as the sun changes its position in the sky. The solar energy collection system is further adapted to reflect additional sunlight onto the solar panels 112, thereby obtaining the benefit of sunlight that would otherwise not impinge on the surface of the solar panels 112.

With respect to the present invention, reflective solar tracker retaining/rotating assembly 200 includes a base assembly (footings 202, footing extensions 204, stationary base 206), a carriage assembly (rollers 208, rotating carriage 210, carriage struts 212, rotating shaft 214, and rack struts 216), and a conventional sun-tracking device 218. As discussed in the '698 Loven patent, the sun-tracking device 218 of the reflective solar tracker retaining/rotating assembly 200 senses the azimuth position of the sun and rotates the carriage assembly accordingly.

Reflective Solar Tracker Array Retaining Assembly

With respect to the reflective solar tracker array retaining assembly 250, as shown in FIGS. 2A and 2B, reflective solar tracker array retaining assembly 250 includes, in part, array rack 252, spacers 254 and photovoltaic (PV) array 103 of ten (10) PV panels 112. Preferably, array rack 252 and spacers 254 are constructed of any suitable, durable, UV resistant, high strength material. It is to be understood that array rack 252 is conventionally attached to spacers 254 by conventional material fastening techniques such as welding, soldering, fasteners or the like. It is to be further understood that spacers 254 are conventionally attached to the back of photovoltaic panels 112 by conventional material fastening techniques such as welding, soldering, fasteners or the like.

Horizontal Reflector Panel

Figure 3A:
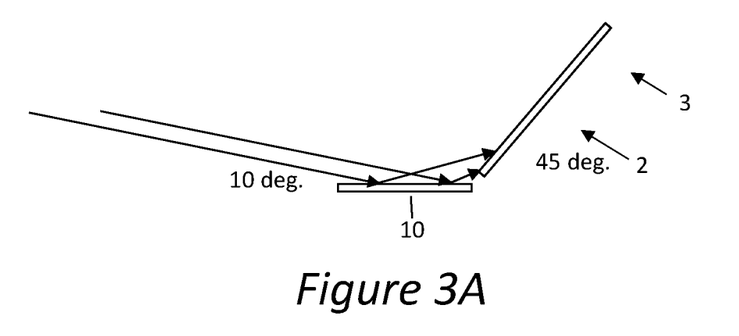
FIGS. 3A-3E are graphical illustrations of various reflection patterns of a mirrored, horizontal reflector, wherein the various reflection patterns are based upon the angle of the sun with respect to the mirrored, horizontal reflector.
Figure 3B:
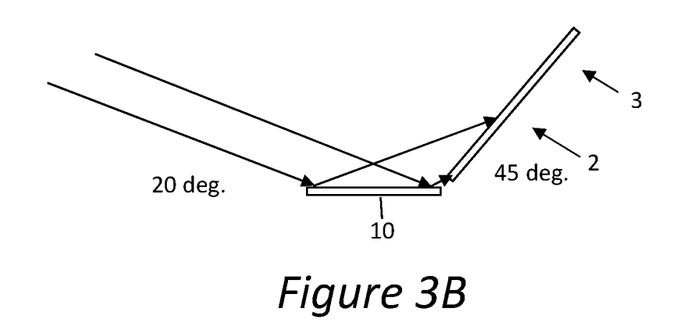
Figure 3C:
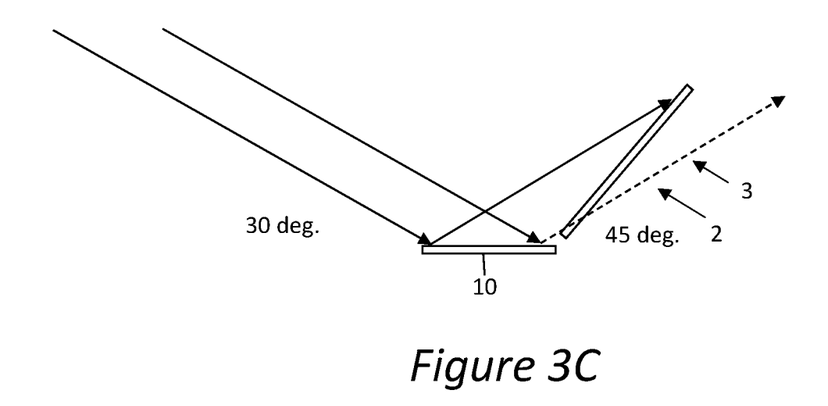
Figure 3D:
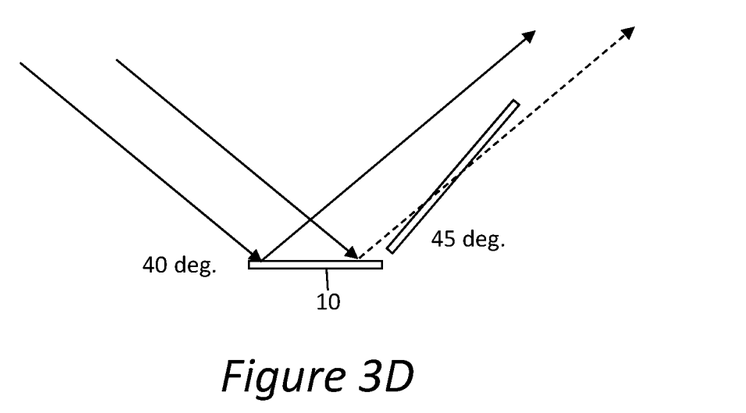
Figure 3E:
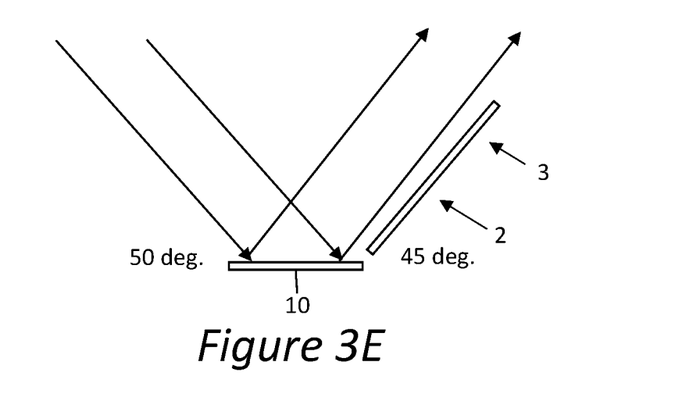

With respect to horizontal reflector panel 110, another unique aspect of the present invention will now be discussed. The horizontal reflector 110 is constructed of a mill grade aluminum sheet over an aluminum framework (not shown). The horizontal reflector 110 is constructed with a non-uniform textured surface finish consisting of scratches or lines 110a going in one direction along the sun-facing surface area of the horizontal reflector 110 (FIG. 5A) and is kept perpendicular to the impinging sun rays and the PV array 103 (FIG. 5A), serving to reflect and diffract (scatter) sunlight, rather than resulting in the coherent beam of light rays created with a mirrored surface. In particular, the reflection pattern of a mirrored surface is shown in FIGS. 3A-3E. The side view of a conventional reflective solar tracker 2 is shown with the horizontal reflector 10 having a conventional mirrored surface and the PV array 3 at 45 degrees. FIGS. 3A-3E show incident sun rays striking the reflector 10, starting with 10° sun altitude, and progressing to a 50° sun altitude. At 10° sun attitude, approximately one tenth of the PV array 3 is illuminated by the reflected rays (FIG. 3A). A 20° sun altitude yields approximately two fifths illumination (FIG. 3B). At 30°, the reflection yields approximately four fifths illumination (FIG. 3C). A 40° sun altitude yields a decrease in illumination to approximately two fifths (FIG. 3D) and by a 50° altitude, reflected rays from the mirrored reflector 10 yield zero reflected sunlight illumination (FIG. 3E).

Figure 4A:
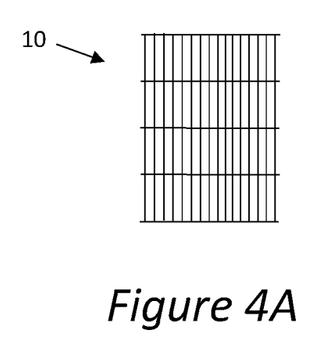
FIG. 4A is a schematic plan view from above illustrating a horizontal reflector having a uniform grating on the surface of the horizontal reflector.

Conversely, as discussed above, the horizontal reflector 110 of the present invention is constructed of a mill grade aluminum sheet. The textured reflector 110 (FIG. 5A) has specific properties to create the diffracting (scattering) of light, as previously discussed. The surface reflects and diffracts the incident sun rays. The scratches or lines 110a in the surface of the reflector 110 are created by conventional surface treatments such as sanding the surface on one axis of the aluminum sheet to form the non-uniform lines or scratches. It is to be understood that the scratches 110a do not have to be continuous lines. Furthermore, the lines created by the scratches 110a in the surface have a random spacing (FIG. 5A) between them rather than the uniform spacing of the reflective diffraction grating (FIG. 4A). It is to be further understood that the scratches 110a should be located substantially parallel to the PV panel array 103 and kept perpendicular to the incident sun rays by the tracking function.

Figure 4B:
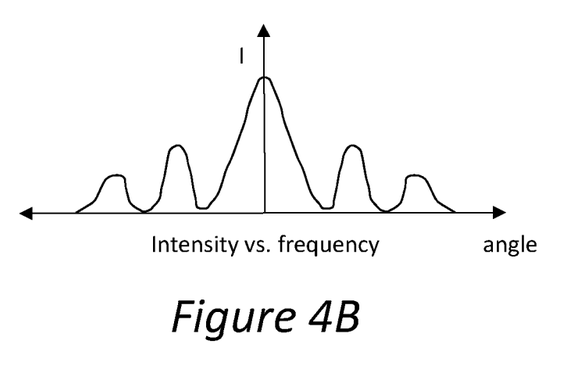
FIG. 4B is a graphical illustration of the intensity (I) of the light scattered by the uniform grating textured reflector of FIG. 4A versus the angle of the light (<) with respect to the surface of the uniform grating surface, horizontal reflector, according to the present invention.
Figure 5A:
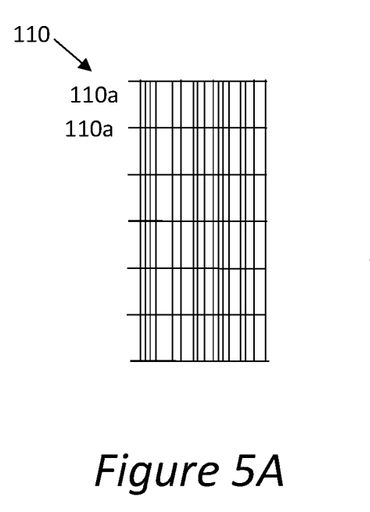
FIG. 5A is a schematic top view illustration of a horizontal reflector having a non-uniform grating on the surface of the horizontal reflector, according to the present invention.
Figure 5B:
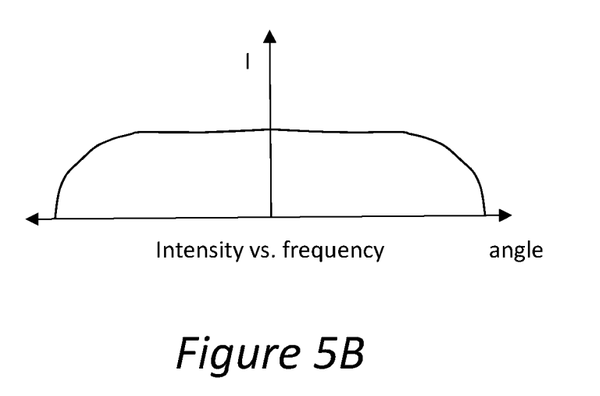
FIG. 5B is a graphical illustration of the intensity (I) of the light scattered by the non-uniform grating textured reflector of FIG. 5A versus the angle of the light (<) with respect to the surface of the non-uniform grating, horizontal reflector, constructed according to the present invention.

To further illustrate this point, as shown in FIG. 4B, a magnified view of a uniformly ruled diffraction grating and the graph of intensity (I) versus angle (<) is illustrated. The intensities are in narrow bands at angles to the left and right of the center axis with orders often referred to as n=−1, −2, −3, and n=1, 2, 3. Conversely, as shown in FIG. 5B, a magnified view of a non-uniform, randomly ruled diffraction grating and the graph of intensity (I) versus angle (<) is illustrated. As clearly shown in FIG. 5B, there are no orders associated with the graph in FIG. 5B because the intensity of light diffracted from the non-uniform, randomly ruled diffraction grating is uniformly dispersed over large angles, both negative and positive.

FIGS. 6A-6E illustrate the benefits of the randomly diffracted light rays from horizontal reflector 110. These randomly diffracted rays are uniformly dispersed over the PV panel array 103, as previously discussed. More particularly, as the sun's altitude changes from 10° to 50° (the sun ascends), the PV panel array 103 is illuminated uniformly with light from the horizontal reflector 110. Note that the center of the diffraction is marked with a C. At 10°, the diffracted rays on the negative side of the diffraction pattern provide most of the illumination on the PV panel array 103. As the sun's altitude increases, the panel array 103 is continuously uniformly illuminated because the diffracted rays are continuous from the negative end to the positive end of the diffracted pattern. Note here that the C legend is the center ray of the diffracted light. As the sun continues its ascent (goes past 50°), it moves out of range of the diffracted reflective light from horizontal reflector 110 and makes little contribution to the illumination of the PV panel array 103.

Figure 7A:
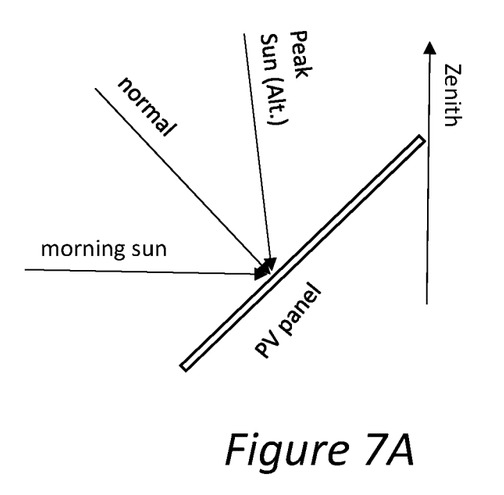
FIG. 7A is a graphical illustration of the angles between the PV panel and the sun, as the sun ascends during the summer solstice, according to the present invention.
Figure 7B:
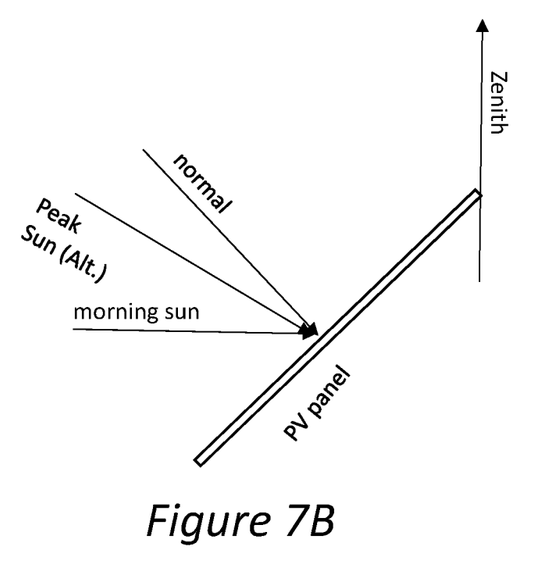
FIG. 7B is a graphical illustration of the angle between the PV panel and the sun, as the sun ascends during the winter solstice, according to the present invention.

It is to be understood that the angle between the horizontal reflector 110 and the PV panel array 103 is determined by several considerations. In regions greater than one latitude from the equator, PV arrays are generally tilted at an angle to the zenith that is equal to the latitude of the array. This permits the optimum collection of energy throughout the year. It is known that photovoltaic panels are engineered to collect energy at a large angle of incident sunlight. It is generally acknowledged light rays between −35° and +35° to the normal of the photovoltaic panel array yields fair to good energy production. This occurs only through part of the year and part of the day, as illustrated in FIGS. 7A and 7B.

Another unique aspect of the present invention is that the horizontal reflector 110 can be used to collect sunlight during early morning hours and late evening hours when the sun is at lower altitudes with respect to the reflective solar tracker 100, namely >0° to 20°.

Figure 8A:
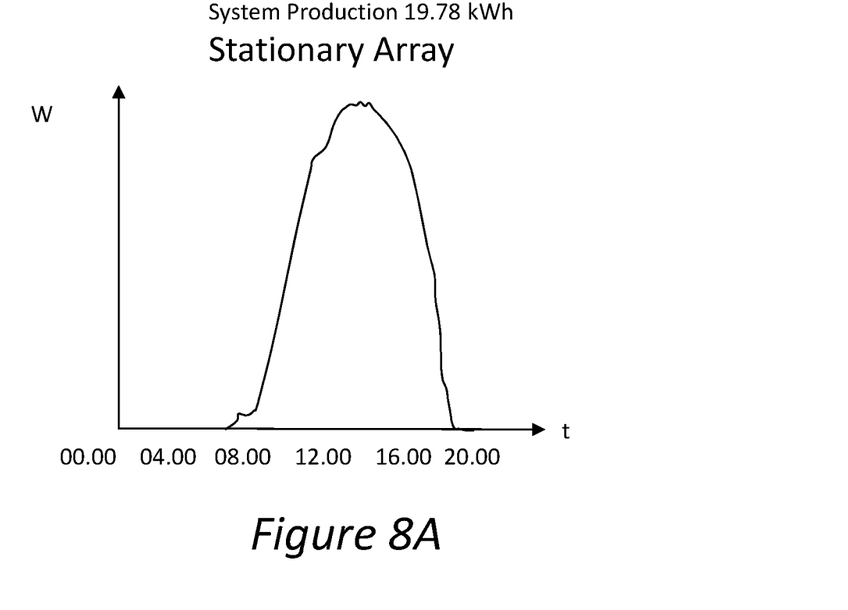
FIG. 8A is a graphical illustration of the power (in kilowatts) versus time (in hours) of a stationary photovoltaic array, according to the present invention.
Figure 8B:
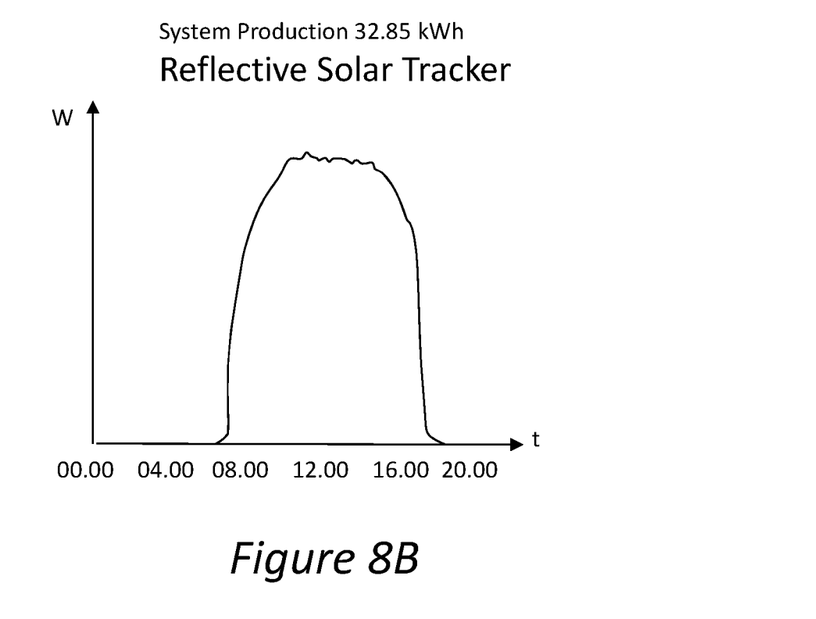
FIG. 8B is a graphical illustration of the power (in kilowatts) versus time (in hours) of the reflective solar tracker having a horizontal reflector, constructed according to the present invention.

In order to prove the effectiveness of the non-uniform surface horizontal reflector 110, as discussed above, the non-uniform surface of horizontal reflector 110 creates reflective diffraction (scatter) sunlight by using a diffracting reflective surface oriented along the horizontal axis that illuminates the PV surfaces of the array 103 with more light and serves to produce more energy from the panels 112 for periods of sunlight that have lower intensity and a poor incident angle such as during the early morning or late evening hours. This produces the power (w) versus time (hours) graph of FIG. 8B for the non-uniform surface horizontal reflector 110 versus the standard graph of FIG. 8A for a stationary PV array. Clearly, the graph of FIG. 8B shows high power production throughout the entire day and in particular, during the early morning hours and the late afternoon hours in the day.

Operation of the Reflective Solar Tracker

During the operation of reflective solar tracker 100, attention is directed to FIGS. 2A, 5A, 5B, 6A-6E, and 8B. In particular, at the start of the day (day break or after sunrise), the altitude of the sun is very low (no greater than 10°) with respect to the reflective solar tracker 100. At this point, the conventional sun tracking device 218 is operated to rotate the reflective solar tracker 100 so that the reflective solar tracker 100 is correctly positioned with respect to the sun, as described in the '698 Loven patent.

Once the sunlight begins to reflectively diffract off of the horizontal reflector panel 110, these diffracted rays are uniformly dispersed over the PV panel array 103 and a portion of the diffracted sunlight is collected by the photovoltaic panels 112 of photovoltaic (PV) array 103, as discussed previously and as shown in FIG. 6A.

Figure 6A:
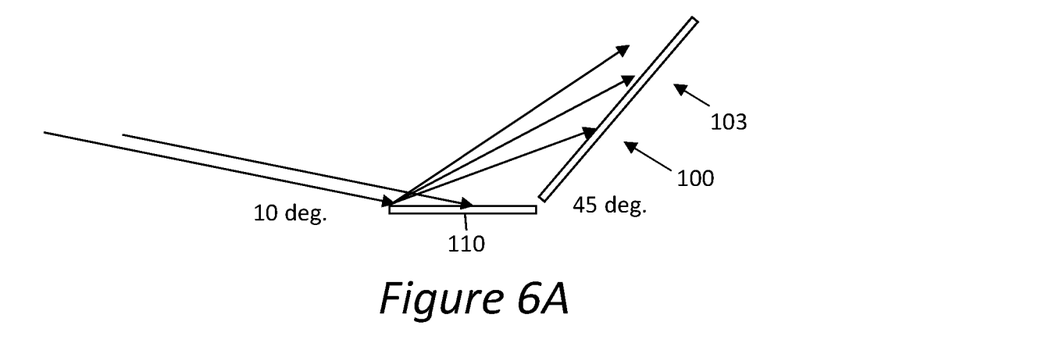
FIGS. 6A-6E are graphical illustrations of various reflection patterns of the non-uniform grating, horizontal reflector of FIG. 5A, wherein the various reflection patterns are based upon the angle of the sun with respect to the non-uniform grating, horizontal reflector of FIG. 5A, constructed according to the present invention.
Figure 6B:
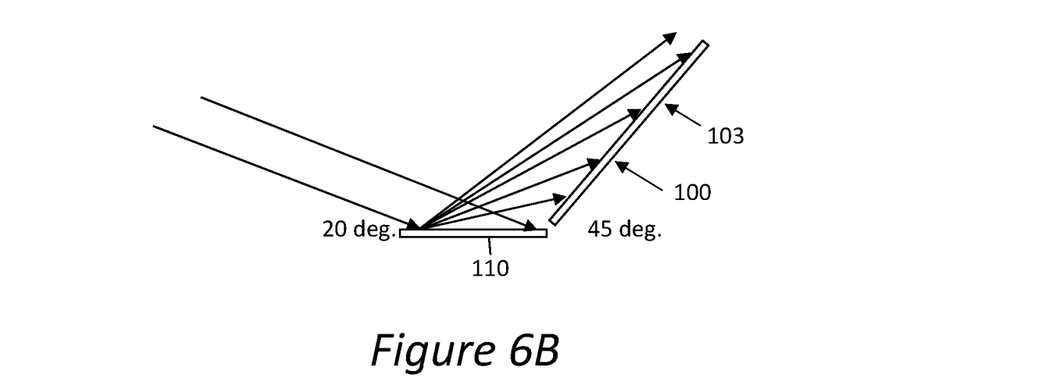
Figure 6C:
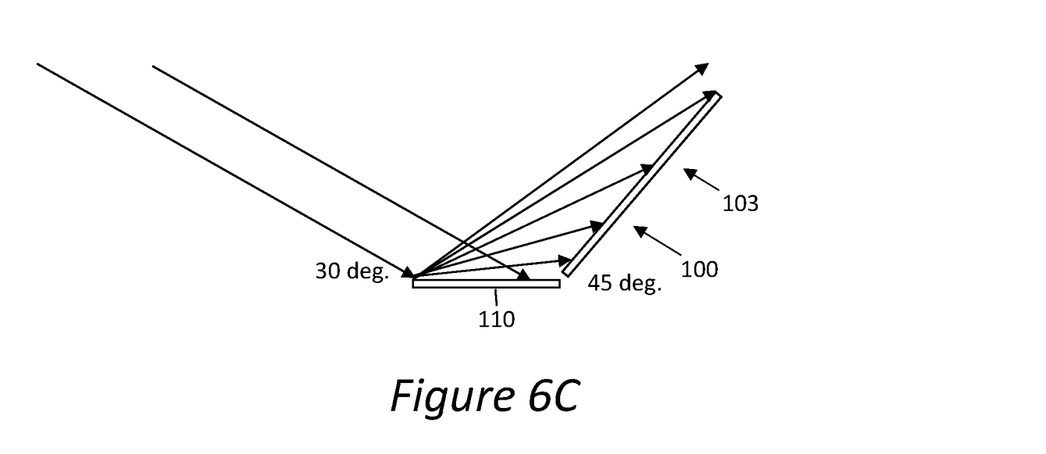
Figure 6D:
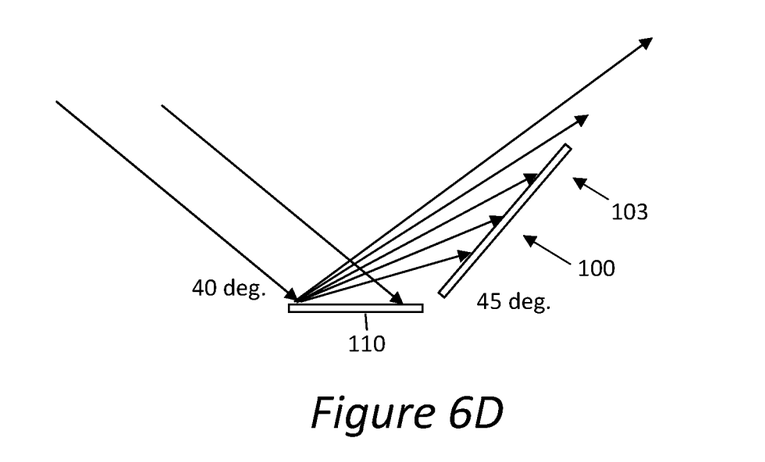
Figure 6E:
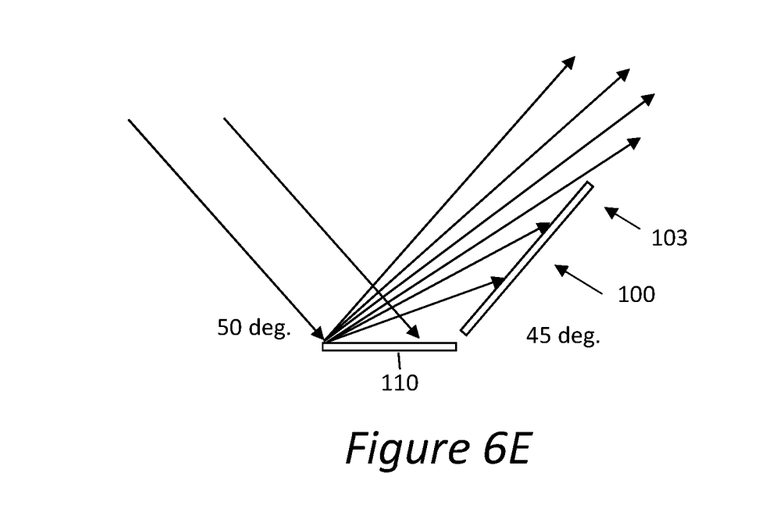

As the sun's altitude changes from 10° to 50°, as shown in FIGS. 6A-6E, the PV panel array 103 is illuminated uniformly with light from the horizontal reflector panel 110. It is to be understood that the conventional sun tracking device 218 is continuously operated to rotate the reflective solar tracker 100 so that the reflective solar tracker 100 is correctly positioned with respect to the sun throughout the ascent and descent of the sun. As discussed earlier, the center of the diffraction is marked with a C. At 10°, the diffracted rays on the negative side of diffraction pattern provides most of the illumination on the PV panel array 103 (FIG. 6A). As the sun's altitude increases, the PV panel array 103 is continuously uniformly illuminated because the diffracted rays are continuous from the negative end to the positive end of the diffracted pattern. Note again that the C legend is the center ray of the diffracted light (FIGS. 6B-6D). As the sun continues its ascent, it moves out of range of the diffracted reflective light and makes little contribution to the illumination of the PV panel array 103 (FIG. 6E).

After the sun has reached its apex (usually around noon), the sun begins its descent. During the descent of the sun, the reflective solar tracker 100 is conventionally rotated through the use of the conventional sun tracking device 218, as discussed earlier. As the sun's altitude changes from 50° to 10°, the PV panel array 103 is illuminated uniformly with light from the horizontal reflector panel 110. In this manner, as the sun's altitude decreases, the PV panel array 103 is continuously uniformly illuminated because the diffracted rays are continuous from the negative end to the positive end of the diffracted pattern. However, at 10° (at or around dusk), the diffracted rays on the negative side of the diffraction pattern provide most of the illumination on the PV panel array 103. As the sun continues its descent, it moves out of range of the diffracted reflective light and makes little contribution to the illumination of the PV panel array 103.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant reserves the right to physically incorporate into the written description or any other portion of the application, any and all such claims. Thus, for example, under no circumstances may the patent be interpreted as allegedly not providing a written description for a claim on the assertion that the precise wording of the claim is not specifically set forth in the written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps and are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description herein above is not intended to limit the invention, except as indicated in the appended claims.

Therefore, provided herein is a new and improved solar energy collection system and method that employs a horizontal reflector having a non-uniform textured surface. The preferred solar energy collection system and method that employs a horizontal reflector having a non-uniform textured surface, according to various embodiments of the present invention, offers the following advantages: ease of use; increased solar energy collection capabilities; reduction in overall size; decreased likelihood of wind damage; reduced amount of wind force acting upon the solar panel array structure; the ability to track the movement of the sun; increased cost effectiveness; and the ability to efficiently collect sunlight at early and late hours of the day. In fact, in many of the preferred embodiments, these advantages of ease of use, increased solar energy collection capabilities, reduction in overall size, decreased likelihood of wind damage, reduced amount of wind force acting upon the solar panel array structure, the ability to track the movement of the sun, increased cost effectiveness, and the ability to efficiently collect sunlight at early and late hours of the day are optimized to an extent that is considerably higher than heretofore achieved in prior, known reflective solar trackers.

I claim:

1. A reflective solar tracker system for collecting solar energy from the sun and converting the solar energy to electricity, using one or more photovoltaic devices, each of which has a sunlight-collecting surface, comprising:
   a reflector panel retaining assembly, wherein the reflector panel retaining assembly further comprises a reflector panel such that the reflector panel includes a non-uniform, textured finish located on a sun-facing surface area of the reflector panel, wherein the non-uniform, textured finish located on a sun-facing surface area of the reflector panel is further comprised of a plurality of non-uniform lines, wherein the non-uniform lines have a random spacing between each of the lines and the lines are substantially parallel to the array of photovoltaic panels;
   a reflective solar tracker retaining/rotating assembly operatively connected to the reflector panel retaining assembly such that the reflective solar tracker retaining/rotating assembly causes rays of the sun to interact with the non-uniform, textured finish and one or more photovoltaic devices; and
   a reflective solar tracker array retaining assembly operatively connected to the reflector panel retaining assembly and the reflective solar tracker retaining/rotating assembly, wherein the reflective solar tracker array retaining assembly is further comprised of:
   an array of photovoltaic panels;
   a plurality of spacers located on a back side of the array of photovoltaic panels; and
   an array rack operatively connected to the plurality of spacers and operatively connected to the reflector panel retaining assembly and the reflective solar tracker retaining/rotating assembly.

2. The reflective solar tracker system, according to claim 1, wherein the reflector panel retaining assembly is further comprised of:
   a reflector strut operatively connected on one end to the reflector panel;
   a cantilever arm operatively connected to the reflector strut;
   a carriage strut operatively connected on one end to the cantilever arm and operatively connected on the other end to the reflective solar tracker retaining/rotating assembly; and
   a toe operatively connected to the cantilever arm and one end of the reflector panel such that the reflector panel can rotate on the toe.

3. The reflective solar tracker system, according to claim 1, wherein the reflective solar tracker retaining/rotating assembly is further comprised of:
   a stationary base;
   a plurality of rollers located adjacent to the stationary base;
   a rotating carriage located adjacent to the plurality of rollers;
   a rotating shaft operatively connected to the rotating carriage;

a carriage strut operatively connected to the rotating carriage and the rotating shaft;

a rack strut operatively connected to the rotating shaft and the reflective solar tracker array retaining assembly; and a sun tracking device operatively connected to the rotating shaft.

4. The reflective solar tracker system, according to claim 1, wherein the plurality of non-uniform lines is further comprised of:

a plurality of non-uniform scratches.

5. The reflective solar tracker system, according to claim 1, wherein the non-uniform, textured finish located on a sun-facing surface area of the reflector panel is further comprised of:

the plurality of non-uniform lines located in one direction along the sun-facing surface area of the reflector panel.

6. A solar energy system for collecting solar energy from the sun and converting the solar energy to electricity, using one or more photovoltaic devices, each of which has a sunlight-collecting surface, comprising:

a reflector panel retaining assembly, wherein the reflector panel retaining assembly further comprises a reflector panel such that the reflector panel includes a non-uniform, textured finish in one direction along a sun-facing surface area of the reflector panel, wherein the non-uniform, textured finish located on a sun-facing surface area of the reflector panel is further comprised of a plurality of non-uniform lines, wherein the non-uniform lines have a random spacing between each of the lines and the lines are substantially parallel to the array of photovoltaic panels;

a reflective solar tracker retaining/rotating assembly operatively connected to the reflector panel retaining assembly such that the reflective solar tracker retaining/rotating assembly causes rays of the sun to interact with the non-uniform, textured finish and one or more photovoltaic devices; and a reflective solar tracker array retaining assembly operatively connected to the reflector panel retaining assembly and the reflective solar tracker retaining/rotating assembly, wherein the reflective solar tracker array retaining assembly is further comprised of:

an array of photovoltaic panels;

a plurality of spacers located on a back side of the array of photovoltaic panels; and an array rack operatively connected to the plurality of spacers and operatively connected to the reflector panel retaining assembly and the reflective solar tracker retaining/rotating assembly.

7. The solar energy system, according to claim 6, wherein the reflector panel retaining assembly is further comprised of:

a reflector strut operatively connected on one end to the reflector panel;

a cantilever arm operatively connected to the reflector strut;

a carriage strut operatively connected on one end to the cantilever arm and operatively connected on the other end to the reflective solar tracker retaining/rotating assembly; and a toe operatively connected to the cantilever arm and one end of the reflector panel such that the reflector panel can rotate on the toe.

8. The solar energy system, according to claim 6, wherein the reflective solar tracker retaining/rotating assembly is further comprised of:

a stationary base;

a plurality of rollers located adjacent to the stationary base;

a rotating carriage located adjacent to the plurality of rollers;

a rotating shaft operatively connected to the rotating carriage;

a carriage strut operatively connected to the rotating carriage and the rotating shaft;

a rack strut operatively connected to the rotating shaft and the reflective solar tracker array retaining assembly; and a sun tracking device operatively connected to the rotating shaft.

9. The solar energy system, according to claim 6, wherein the plurality of non-uniform lines is further comprised of:

a plurality of non-uniform scratches.

\* \* \* \* \*